Figure 8:
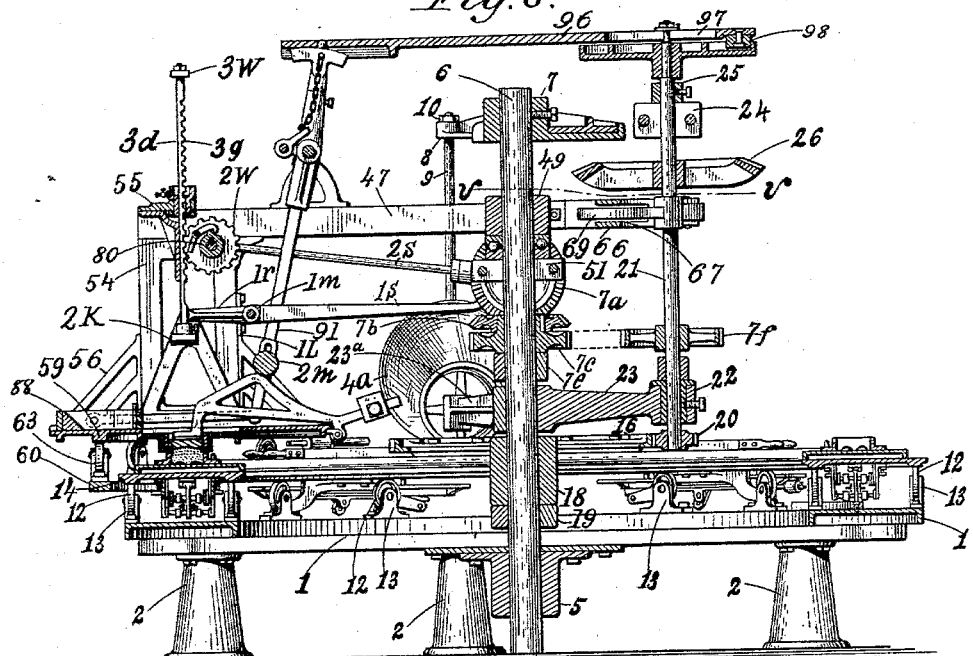

(No Model.)  13 Sheets—Sheet 1.
O. BRYANT.
MOLDING MACHINE.
No. 569,743. Patented Oct. 20, 1896.
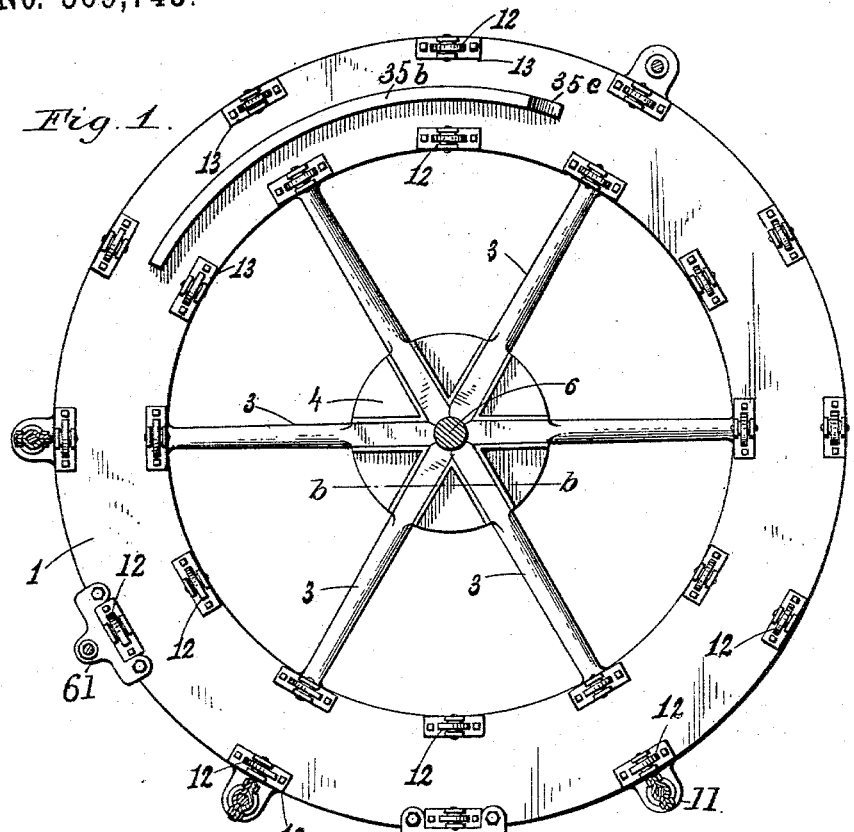
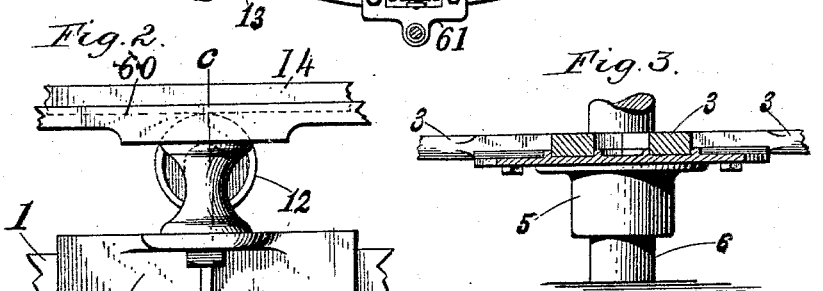
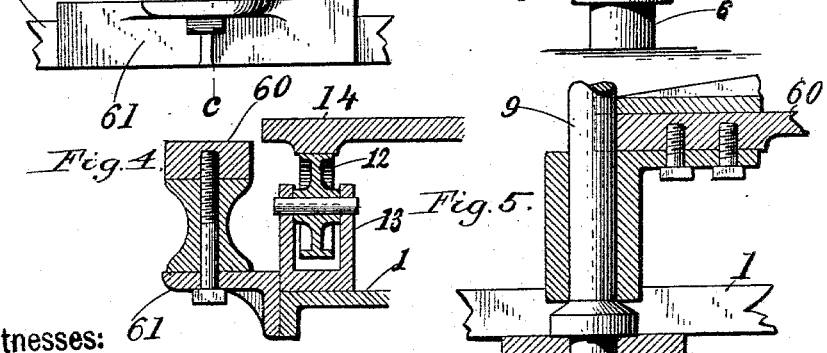
Witnesses:
Emil Neuhart
A. J. Sangster
Inventor
Orrin Bryant
By James Sangster
Attorney (No Model.)  13 Sheets—Sheet 2.
O. BRYANT.
MOLDING MACHINE.
No. 569,743.  Patented Oct. 20, 1896.
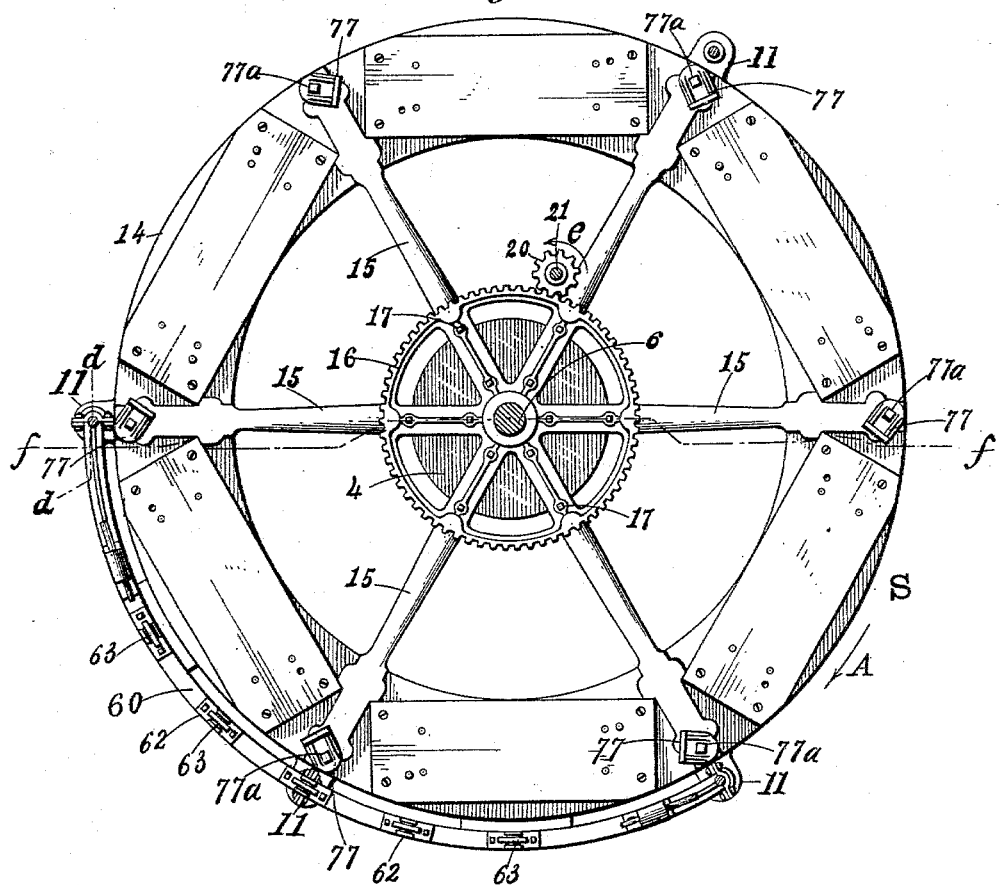
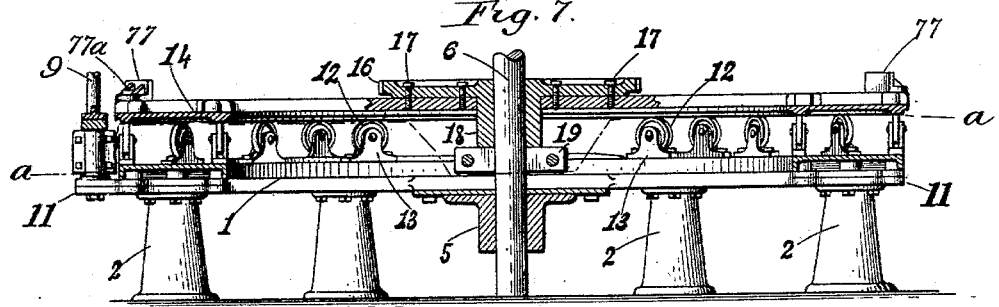
Witnesses.  Orrin Bryant, Inventor
By James Sangster, Attorney.

(No Model.) 13 Sheets—Sheet 3.

O. BRYANT.
MOLDING MACHINE.

No. 569,743. Patented Oct. 20, 1896.

Witnesses.
Emil Neuhart.
A. J. Sangster.

Orrin Bryant, Inventor.
By James Sangster, Attorney.

(No Model.)
O. BRYANT.
MOLDING MACHINE.
No. 569,743. Patented Oct. 20, 1896.
13 Sheets—Sheet 4.
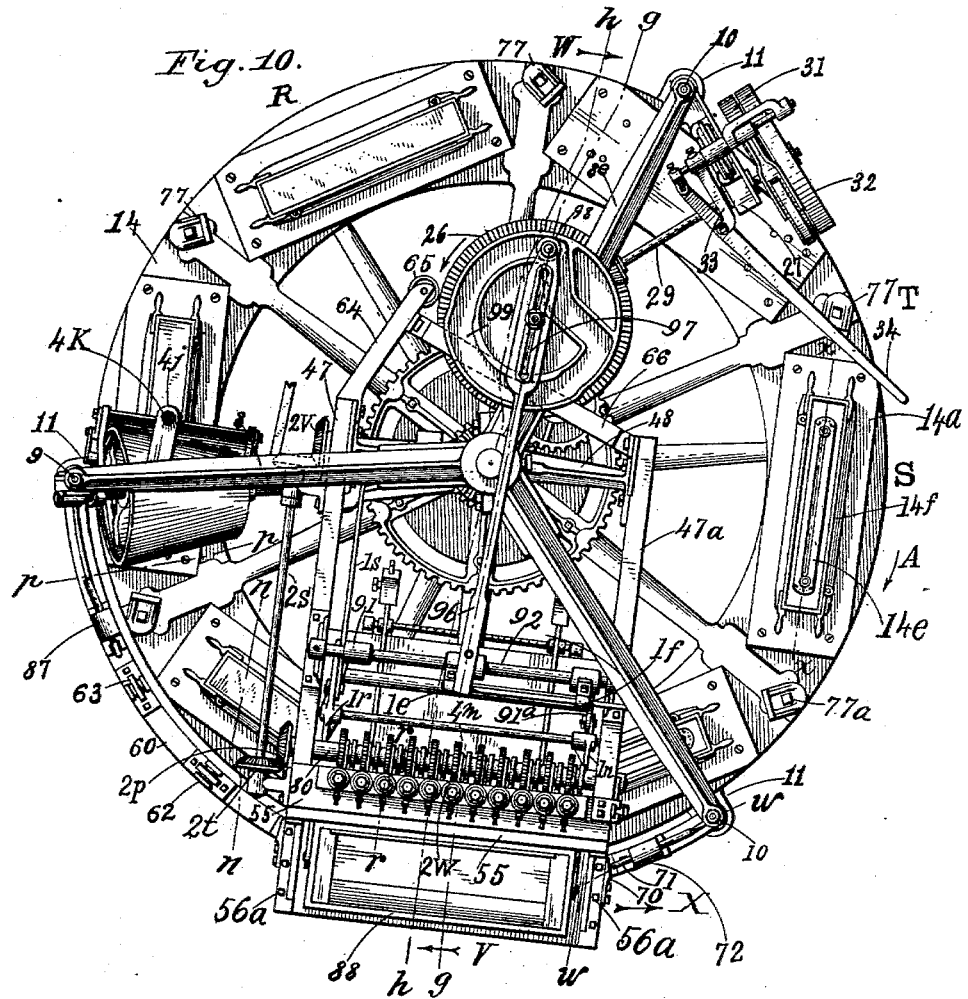
Witnesses:
Emily Newhart
A. J. Sangster
Orrin Bryant, Inventor
By James Sangster, Attorney (No Model.) 13 Sheets—Sheet 5.
O. BRYANT.
MOLDING MACHINE.
No. 569,743. Patented Oct. 20, 1896.
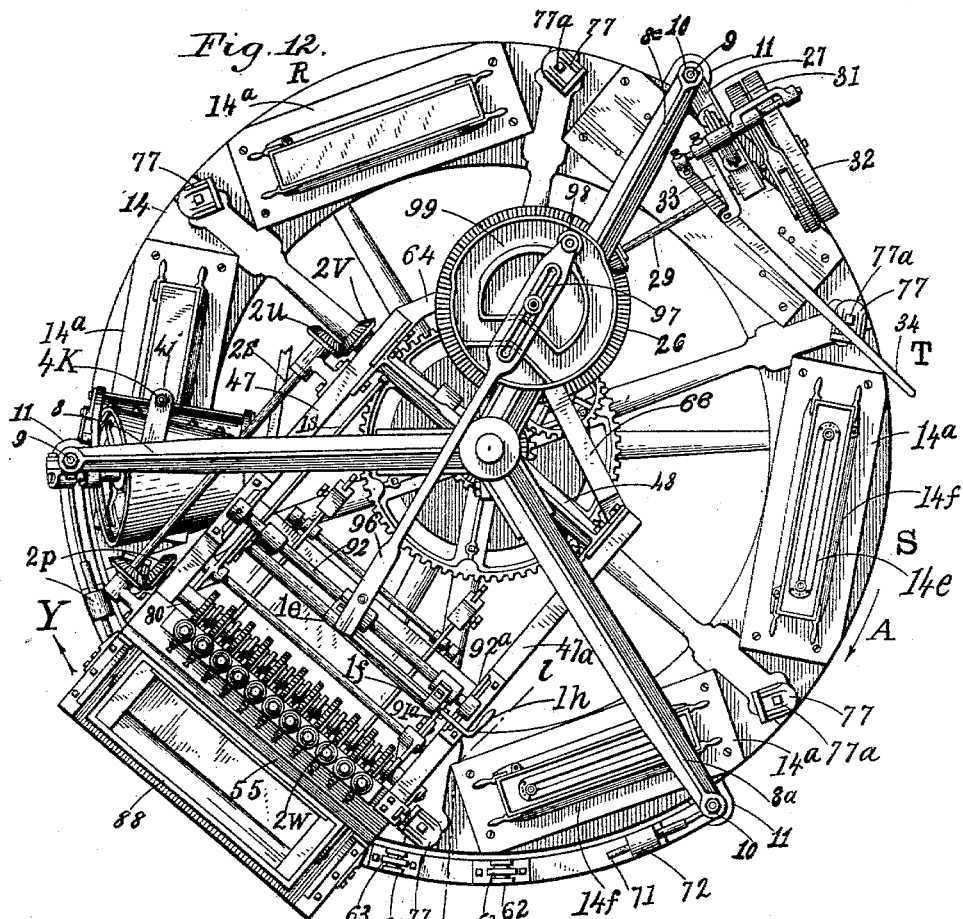
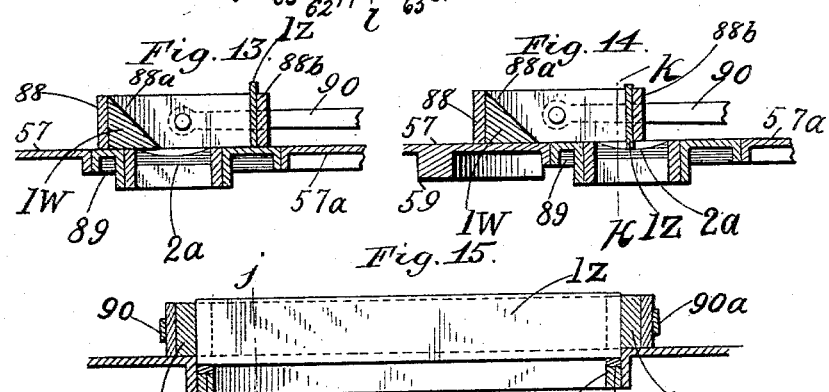
Witnesses: Emil Neuhart, A. Sangster
Inventor: Orrin Bryant
By James Sangster, Attorney.
THE NORRIS PETERS CO., PHOTO-LITHO., WASHINGTON, D. C.

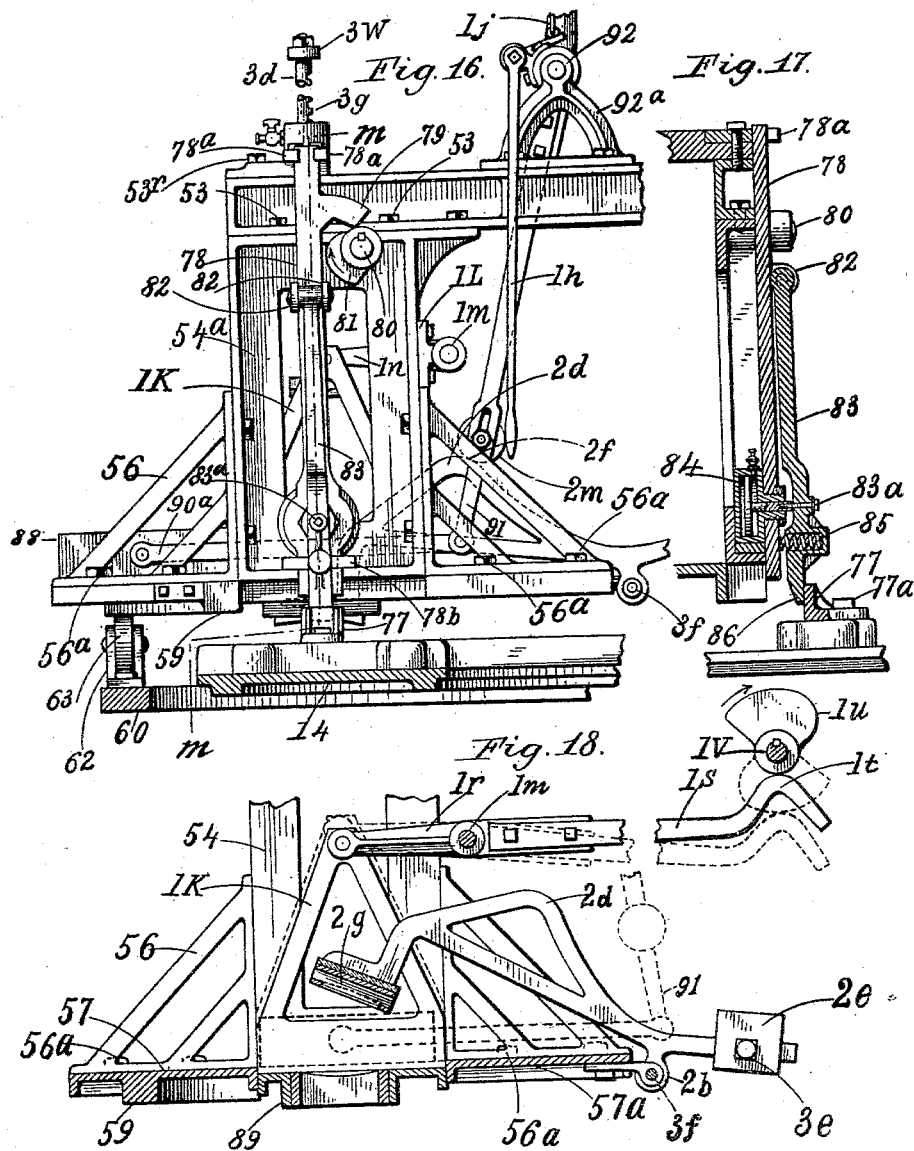

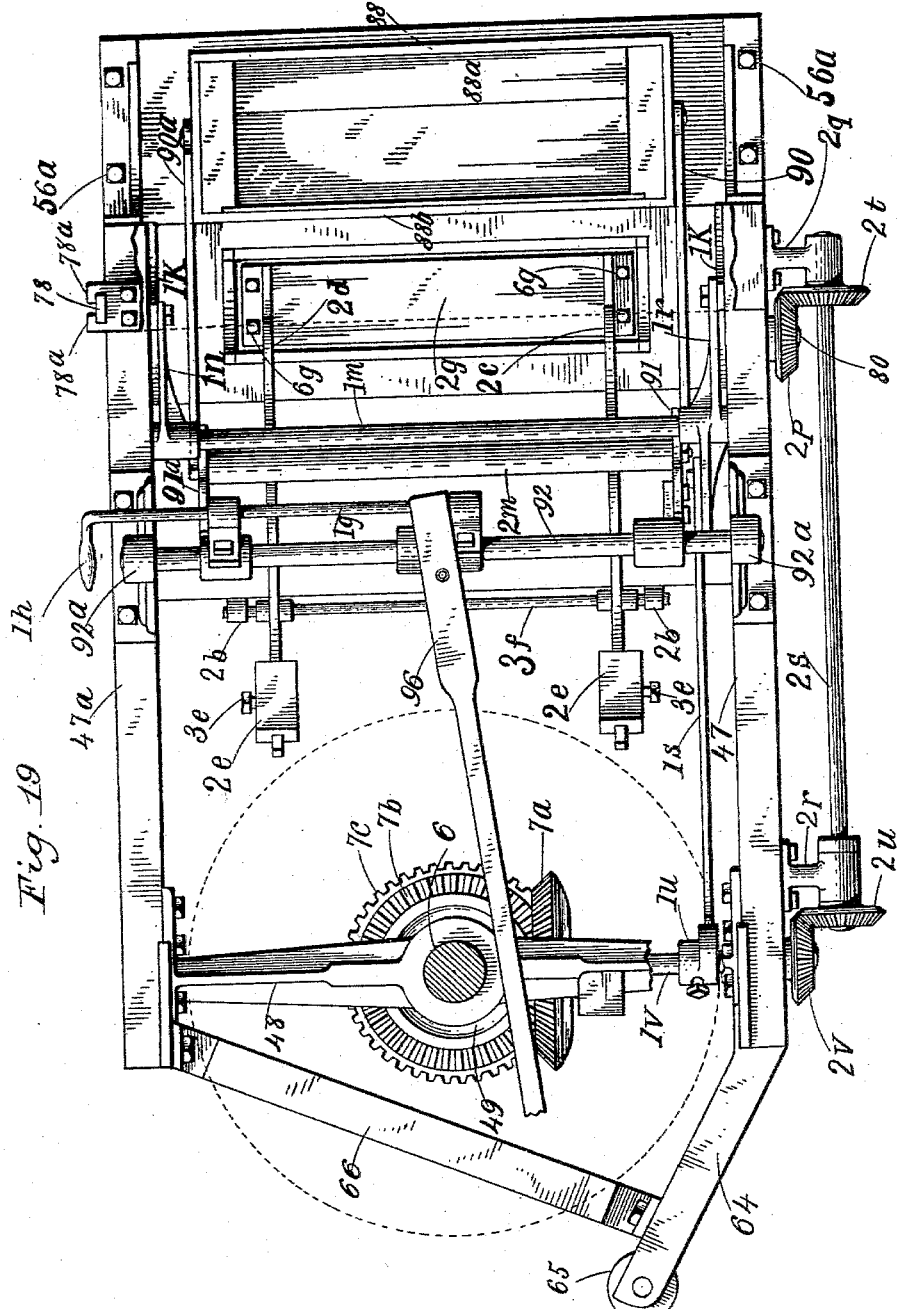

(No Model.) 13 Sheets—Sheet 8.
O. BRYANT.
MOLDING MACHINE.
No. 569,743. Patented Oct. 20, 1896.
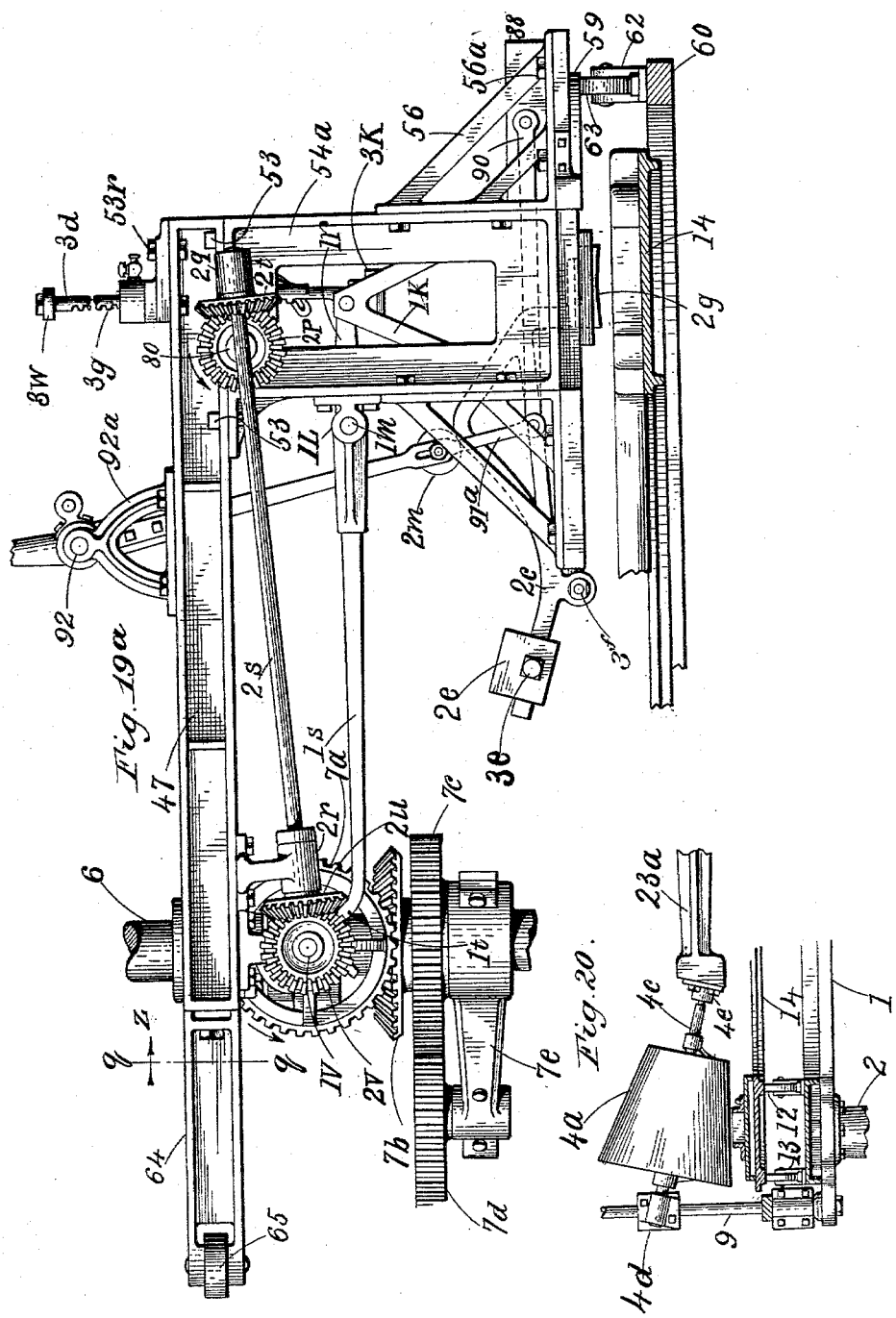
Witnesses:
Emil Neuhart
A. J. Sangster
Orrin Bryant, Inventor
By James Sangster, Attorney (No Model.) 13 Sheets—Sheet 9.
O. BRYANT.
MOLDING MACHINE.
No. 569,743. Patented Oct. 20, 1896.
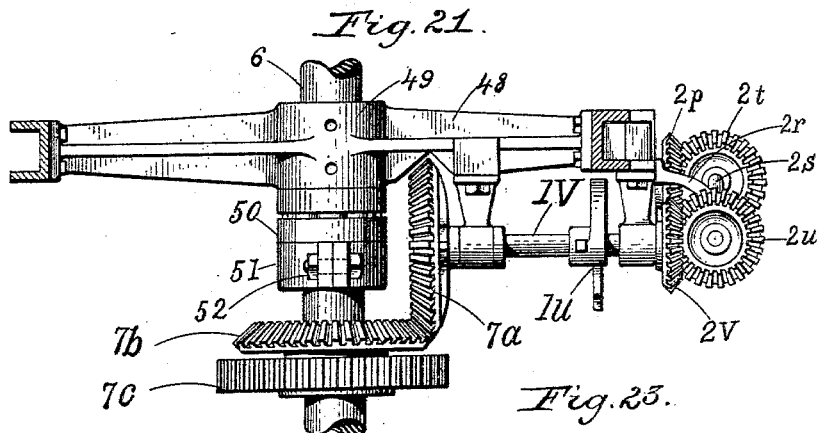
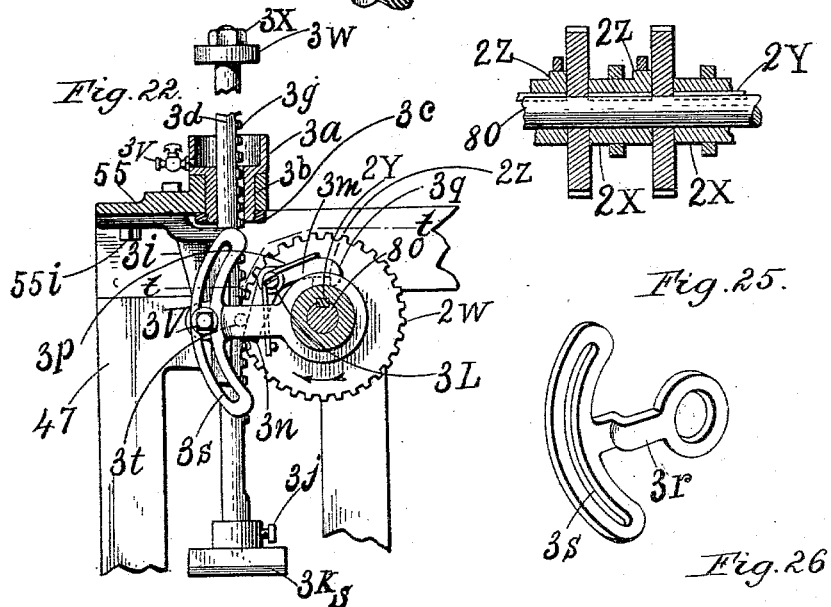
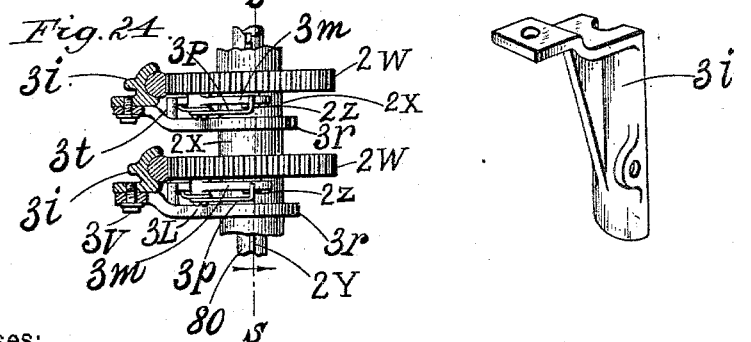
Witnesses:
Emil Neuhart
A. J. Sangster
Orrin Bryant Inventor.
By James Sangster
Attorney.

(No Model.)
13 Sheets—Sheet 10.
O. BRYANT.
MOLDING MACHINE.
No. 569,743.  Patented Oct. 20, 1896.
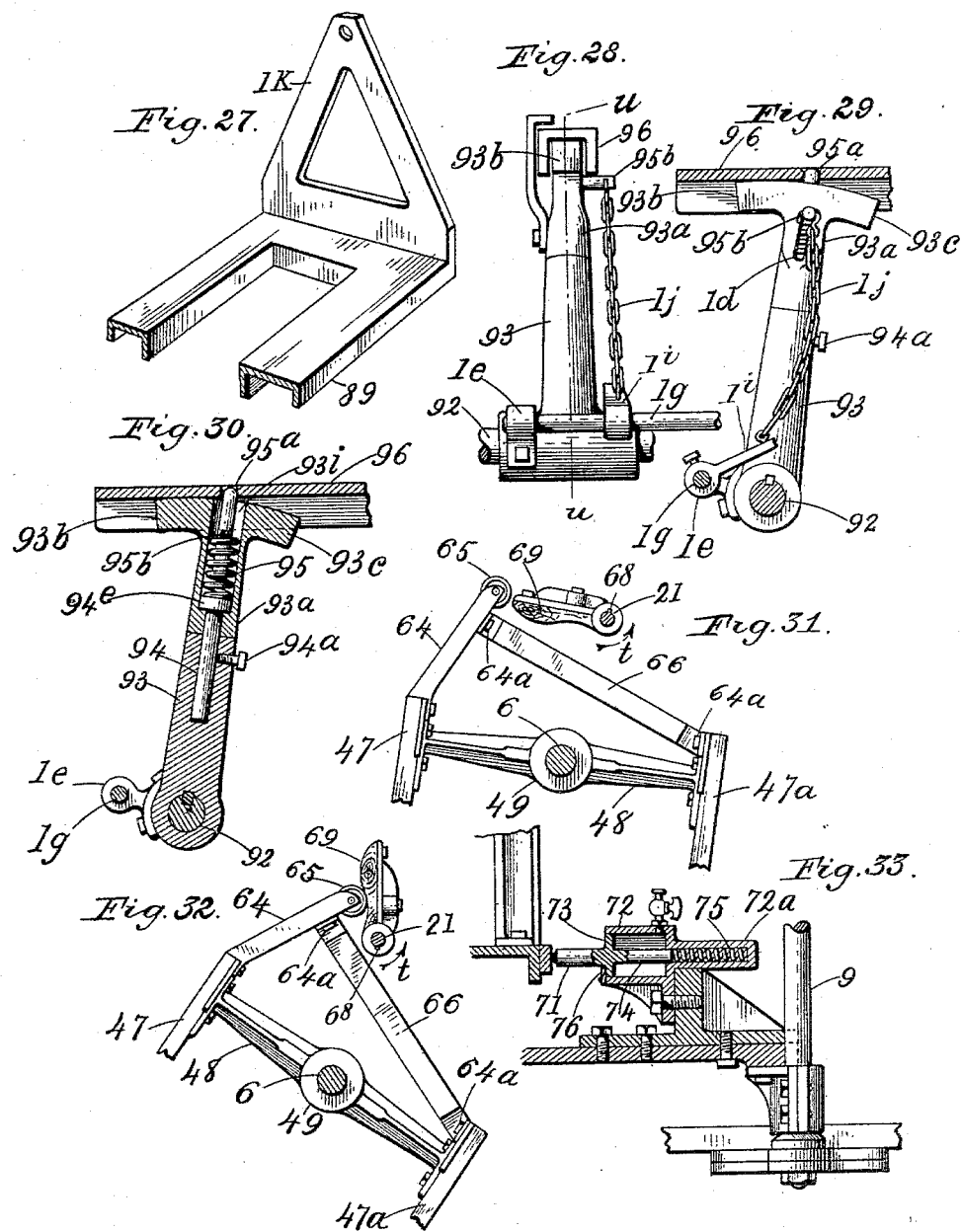
Witnesses:
Emil Neuhart
A. J. Sangster
Orrin Bryant Inventor.
By James Sangster Attorney.

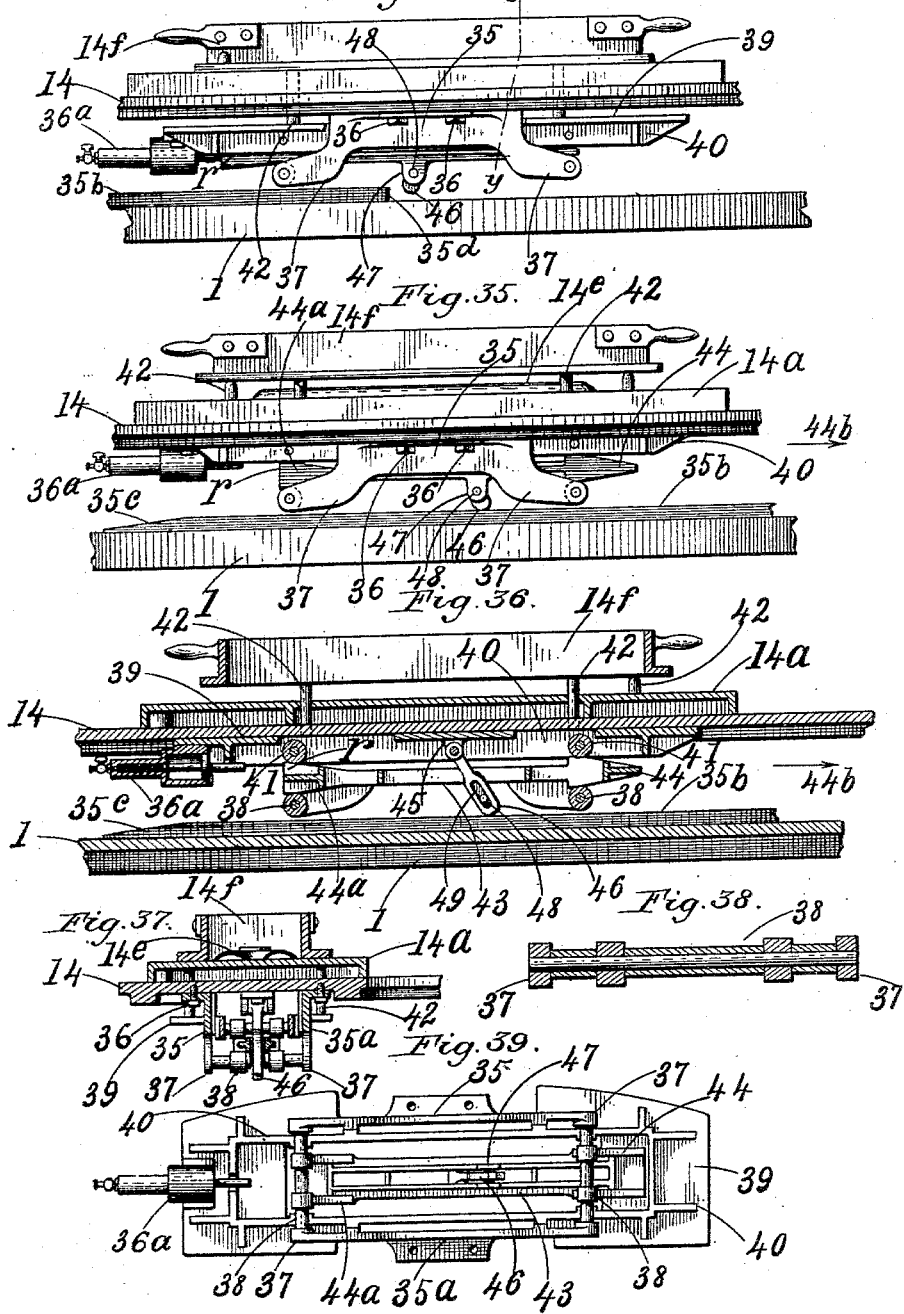

(No Model.)
13 Sheets—Sheet 12.
O. BRYANT.
MOLDING MACHINE.
No. 569,743.  Patented Oct. 20, 1896.
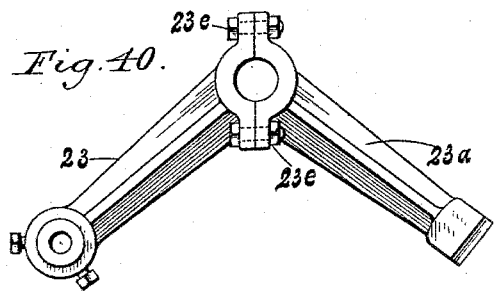
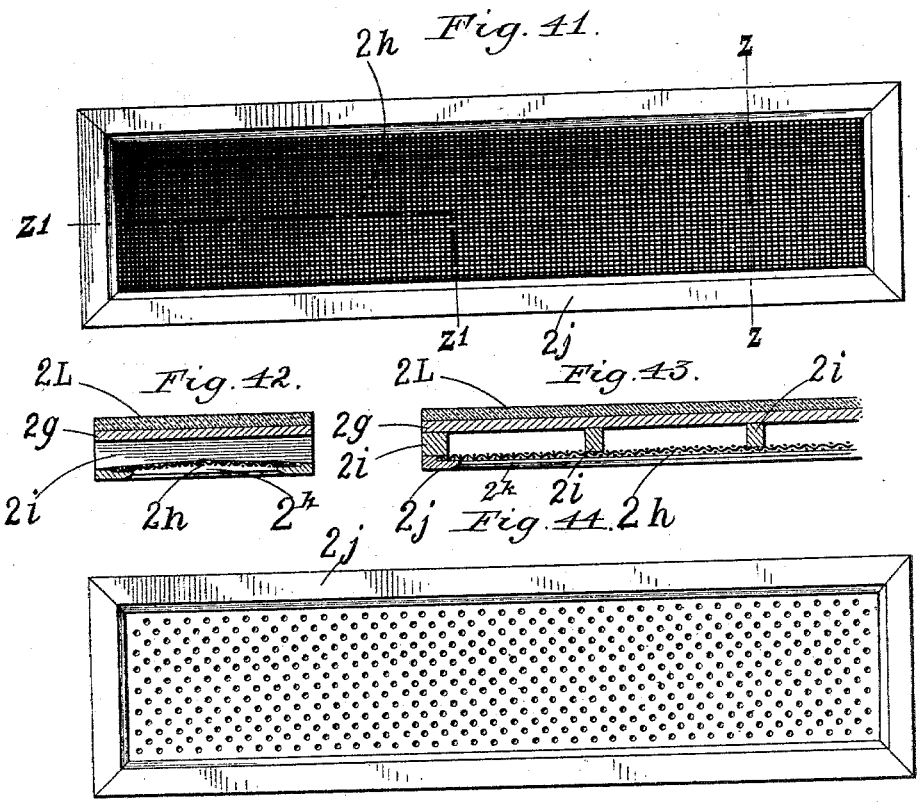
Witnesses.
Emil Neuhart
A. J. Sangster
Orrin Bryant Inventor.
By James Sangster
Attorney.
THE NORRIS PETERS CO., PHOTO-LITHO., WASHINGTON, D. C.

(No Model.) 13 Sheets—Sheet 13.
O. BRYANT.
MOLDING MACHINE.
No. 569,743. Patented Oct. 20, 1896.
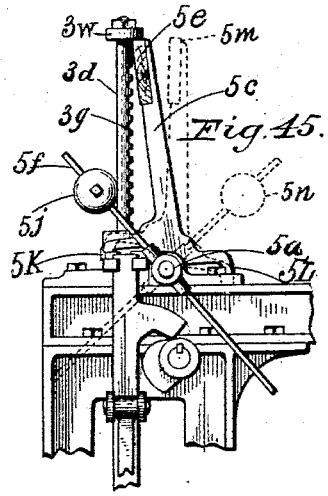
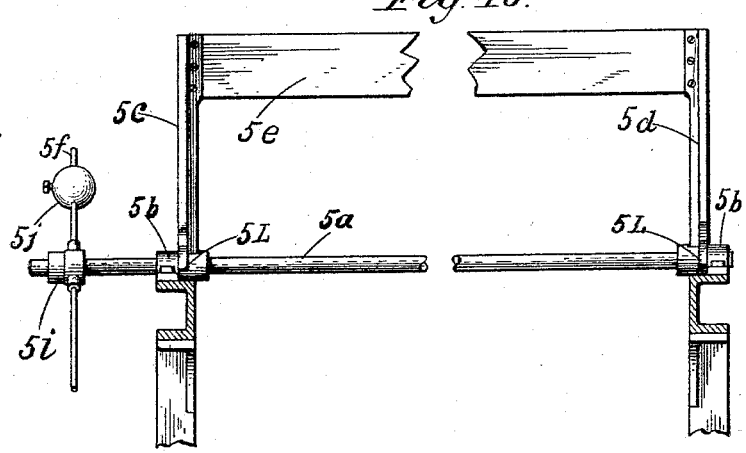
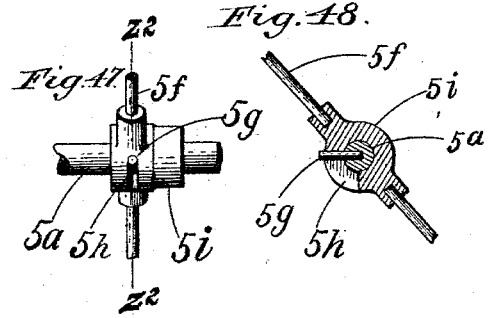
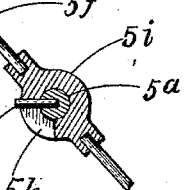
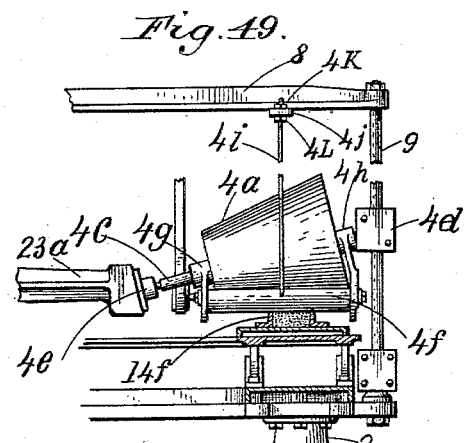
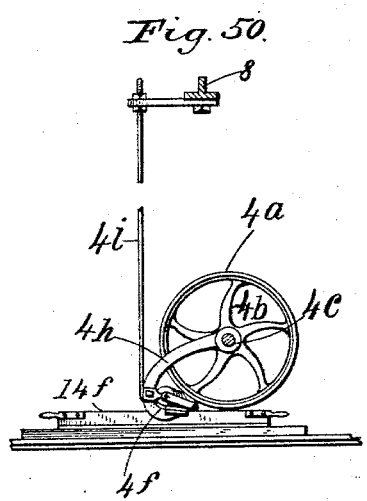
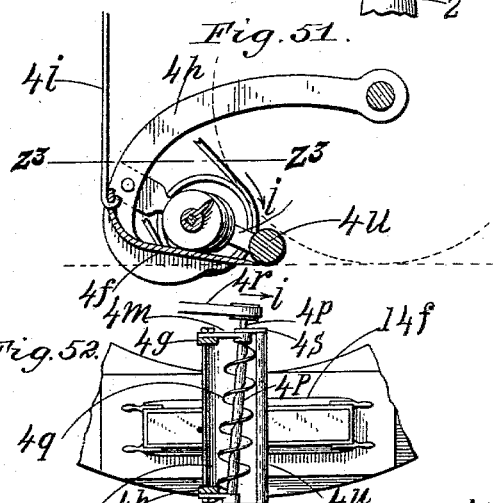
Witnesses. Inventor.
Emil Neuhart. Orrin Bryant
A. J. Sangster. By James Sangster,
Attorney.
THE NORRIS PETERS CO., PHOTO-LITHO., WASHINGTON, D. C.

UNITED STATES PATENT OFFICE.

ORRIN BRYANT, OF BUFFALO, NEW YORK, ASSIGNOR TO THE BRYANT IRON WORKS COMPANY, OF SAME PLACE.

MOLDING-MACHINE.

SPECIFICATION forming part of Letters Patent No. 569,743, dated October 20, 1896.

Application filed October 1, 1895. Serial No. 564,289. (No model.)

*To all whom it may concern:*

Be it known that I, ORRIN BRYANT, a citizen of the United States, residing at Buffalo, in the county of Erie and State of New York, have invented certain new and useful Improvements in Molding-Machines, of which the following is a specification.

My invention relates to that class or type of molding-machines in which sand is used and a rotating table employed for carrying a series of flasks, each of which passes through, successively, the different operations required for preparing and completing sand molds for casting, all of which operations are performed while the flasks are being carried by the rotating table from the point they are deposited thereon to the point where they are removed therefrom.

The object of my invention is to produce a machine that shall be strong and durable in its structure, and capable of being adjusted to conform in its action to the varying conditions required for molding from patterns of different sizes and forms, and thereby produce sand molds having all the qualities of molds made by hand, but with greater rapidity and on a much larger scale, all of which will be fully and clearly hereinafter described and claimed, reference being had to the accompanying drawings, in which—

Figure 9:
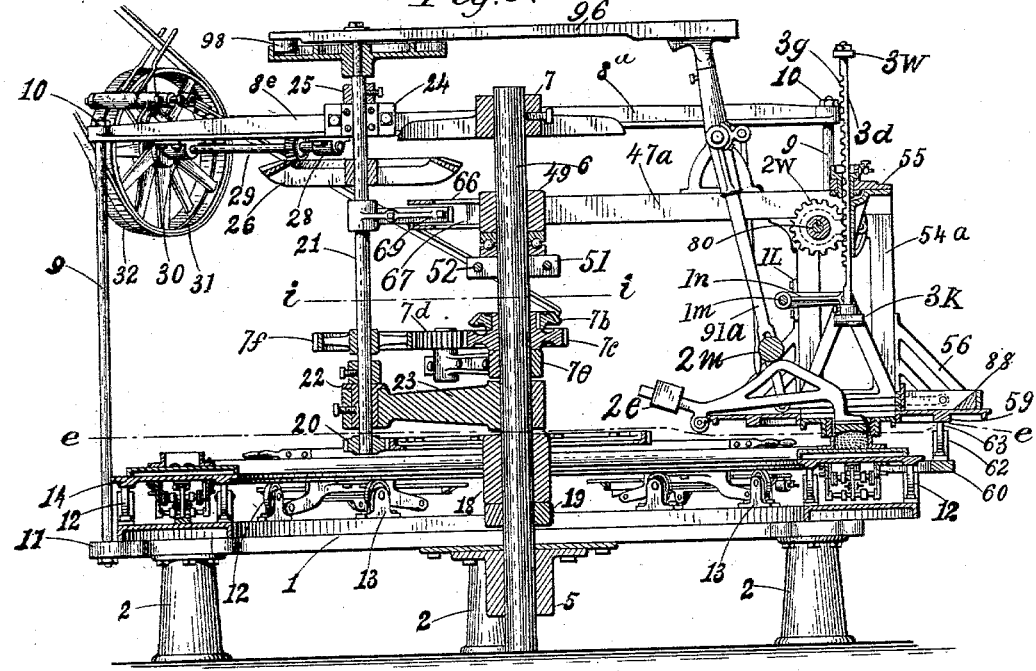

Figure 1 represents a plan view of the stationary table and framework on which the movable table turns, showing a horizontal section on or about line $a\ a$, Fig. 7. Fig. 2 represents an enlarged front elevation of one of the brackets for supporting the curved bar and friction-rollers upon which the frame carrying the stamping mechanism moves in the arc of a circle back and forth. Fig. 3 represents an enlarged vertical section through the lower portion of the frame on or about line $b\ b$, Fig. 1. Fig. 4 is a vertical section on or about line $c\ c$, Fig. 2, cutting through one of the above-mentioned brackets and one of the rollers and its supporting-frame. Fig. 5 represents an enlarged vertical section on or about line $d\ d$, Fig. 6. Fig. 6 is a horizontal section on or about line $e\ e$, Fig. 9, showing a plan or top view of the movable table with the flasks removed. Fig. 7 is a vertical transverse section through the lower portion of the machine on or about line $f\ f$, Fig. 6, the flask-raising device being removed. Fig. 8 represents a vertical transverse section through the machine on or about line $g\ g$, Fig. 10, looking in the direction of the arrow V. Fig. 9 is a vertical transverse section on or about line $h\ h$, Fig. 10, looking in the direction of the arrow W. Fig. 10 represents a top plan view of the complete machine, showing the stamping or "ramming" mechanism at the limit of its swinging movement in the direction of the arrow X. Fig. 11 is a horizontal section on or about line $i\ i$, Fig. 9, showing a detached plan view of the train of gearing below the section. Fig. 12 represents a top plan view of the complete machine, showing the stamping mechanism at the limit of its movement in the direction of the arrow Y. Fig. 13 represents a transverse vertical section through the sand-box and platform upon which it moves on or about line $j\ j$, Fig. 15, the sand-box being shown in its rear position and the scraper in its upward position. Fig. 14 represents a similar section showing the sand-box about midway of its movement across the platform and the scraper in its lowest position or in action. Fig. 15 is a vertical longitudinal section through the sand-box and platform on or about line $k\ k$, Fig. 14. Fig. 16 represents a side elevation of the front portion of the stamping-frame and a portion of the mechanism carried by it, showing a vertical section through the movable table on or about line $l\ l$, Fig. 12. Fig. 17 represents a vertical section on or about line $m\ m$, Fig. 16, cutting through one side of the stamping-frame and its adjoining mechanism. Fig. 18 represents a transverse section through the platform of the stamping-frame, showing also mechanism for raising the central portion. Fig. 19 represents a top plan view of the horizontally-swinging table, a portion of the top mechanism being removed, so as to expose a plan view of the mechanism for operating the reciprocating sand-box, the vertically-movable frame, and the pressing-platen and its operating mechanism. Fig. 19ª represents a side elevation of the stamping-frame and a portion of its operating mechanism, showing a vertical section through the platform on or about line $n\ n$, Fig. 10, the flask being omitted. Fig. 20 is a detached side elevation of the tapering sand-roller, showing also a vertical section through line $p\ p$, Fig. 10. Fig. 21 represents a detached elevation of the gearing for operating the stampers, showing a section on or about line $q\ q$, Fig. 19$^a$, looking in the direction of the arrow $z$. Fig. 22 represents an enlarged detached vertical section on or about line $r\ r$, Fig. 10, showing the stamping mechanism. Fig. 23 is a vertical section on or about line $s\ s$, Fig. 24. Fig. 24 is a horizontal section on or about line $t\ t$, Fig. 22. Fig. 25 represents a detached perspective view of the adjusting-segment for adjusting the stamping movement. Fig. 26 is a detached perspective view of the guide-bracket for one of the stampers. Fig. 27 is an enlarged detached perspective view of one-half of the central portion of the stamping-platform. Fig. 28 is a detached front view of the rock-arm that operates the shaft-carrying arms connected with the sand-box for moving it. Fig. 29 represents a side elevation of the same, showing also a longitudinal section through a portion of cam-arm for operating it. Fig. 30 is a detached vertical section on or about line $u\ u$, Fig. 28. Fig. 31 represents a detached horizontal section on or about line $v\ v$, Fig. 8, showing a fragmentary plan view of the stamping-frame brought to the position shown by the arrow X, Fig. 10, showing also the rotating cam for operating it. Fig. 32 represents a similar view of the stamping-frame, showing it in the position designated by the arrow Y, Fig. 12, showing also the position of the cam for swinging it back into the position shown in Fig. 31. Fig. 33 represents an enlarged detached vertical section on or about line $w\ w$, Fig. 10, showing the butting portion of the stamping-frame against the air-cushion. Fig. 34 is an enlarged side elevation of the flask-lifting mechanism and its adjoining parts, showing a flask in its lowest position on the table, or in position for use. Fig. 35 represents a similar view showing the flask raised in position ready to be removed. Fig. 36 is an enlarged longitudinal section on or about line $x\ x$, Fig. 10, showing the flask in its elevated position, and also the flask-raising mechanism. Fig. 37 represents a transverse section on or about line $y\ y$, Fig. 34. Fig. 38 is an enlarged central section through one of the rollers of the flask-raising device. Fig. 39 represents an enlarged detached inverted view of the flask-raising mechanism. Fig. 40 represents an enlarged top plan view of the stationary angular double arm for supporting the lower end of the vertical driving-shaft at one side of the machine and the tapering roller for leveling the sand in the flask at or near the other side of the machine, as will appear more clearly farther on. Fig. 41 represents an enlarged inverted plan view of the intermediate sand condensing or ramming device. Fig. 42 is a transverse section through a portion of the intermediate sand-condensing device on or about line $z\ z$, Fig. 41. Fig. 43 is a longitudinal section through the same on or about line $z'\ z'$, Fig. 41. Fig. 44 represents an inverted plan view showing a slight modification of the device. Fig. 45 represents a front portion of the stamping-frame or horizontally-swinging frame, showing a side elevation of the device for holding the ramming-hammers up or out of action when not required for use. Fig. 46 is a rear elevation of the same device, showing it separate from the ramming-hammers and their operating mechanism. Fig. 47 is a front view of the hand-lever forming a part of the mechanism for holding the ramming-hammers out of action. Fig. 48 represents a central section on or about line $z^2\ z^2$, Fig. 47. Fig. 49 represents a rear elevation of the conical leveling-roller and its connecting parts, showing a vertical cross-section through the flask, sand-mold, and stationary and movable tables, showing also a rear end view of the device for scraping off the sand that may remain on the flask after passing under the conical leveling-roller. Fig. 50 represents an end elevation of the leveling-roller and a similar view of the scraping device. Fig. 51 represents an enlarged cross-section through the scraping device, showing the position of the leveling-roller and flask in dotted lines. Fig. 52 represents a horizontal section on or about line $z^3\ z^3$, Fig. 51, showing a top plan view of the scraping device, conveyer, and other mechanism connected with it.

Referring to the drawings in detail and to the supporting-frame of the machine, reference is made to Figs. 1, 6, and 7, also to the plan view of the machine, Fig. 10. The stationary base of the machine consists of an annular table 1, preferably of cast-iron, (about twelve feet in diameter in a large-size machine,) and is supported on a series of iron columns 2. (See Fig. 7.) A series of radiating arms 3 connect this annular table with a central portion 4, having secured to its under side, by bolts, a depending hub 5. (Shown in Fig. 7.)

In the center of the table and hub 5 is mounted and rigidly secured a vertical shaft 6, which extends from the floor upon which the machine stands up through the center of the hub 5. (See Figs. 8 and 9, where the whole of the vertical shaft 6 is shown.) The upper portion of the shaft 6 passes through the hub 7 of the three horizontal frame-pieces 8, 8$^a$, and 8$^c$. (See Figs. 9, 10, or 12, where the top frame-pieces are shown.) The outer ends of the horizontal frame-pieces 8, 8$^a$, and 8$^c$ are secured to the vertical bars 9 by screw-nuts 10, said bars 9 having their lower ends rigidly secured also by screw-nuts to lugs 11, extending from the table 1. (See Fig. 9.)

On the top of the annular stationary table 1 is a double series of rollers 12, mounted in supporting-frames 13, so as to turn easily therein. (See Figs. 4 and 7.) On the tops of these rollers 12 is mounted an annular rotatable horizontal table 14. (See Figs. 6 and 7.) This table is also provided with arms 15, that radiate from the center, which arms are rigidly secured to the table by bolts and near the center of the table 14 to a horizontal spur gear-wheel 16 by bolts 17. The hub 18 of the spur-wheel 16 extends down below the center of the annular table 14 at the inner ends of the arms 15 (see Figs. 7 and 8) and rests on a stationary two-part collar 19, which is rigidly secured to the vertical shaft 6 by means of screw-bolts in the usual way of clamping and rigidly securing such collars, thereby providing a substantial and solid base upon which the hub 18, that supports and carries the central portion of the rotatable table 14 and the horizontal spur gear-wheel and other mechanism and supporting parts connected therewith, rests and rotates. The vertical shaft 6 passes up through the spur-gear-wheel hub 18, so that the center of the table 14 turns on said shaft and is supported on the stationary collar 19.

The gearing for operating the annular table 14 consists of a pinion 20, adapted to gear in with the teeth in the horizontal gear-wheel 16. (See Fig. 6.) The pinion 20 is rigidly secured to a vertical shaft 21, (see Figs. 6, 8, and 9,) mounted at its lower end in a box 22 on an arm 23, rigidly secured to the vertical shaft 6. The arm 23 is part of a double arm consisting of the two parts 23 and $23^a$, clamped to the shaft 6 and rigidly secured by bolts $23^c$. (See Fig. 40.) The upper portion of the shaft 21 is mounted in a box 24. On one of the top frame-bars $8^e$, above box 24, is a collar 25, rigidly secured to the shaft 21 by a set-screw, and below the box 24 is mounted and rigidly secured on the same shaft 21 a horizontal bevel gear-wheel 26. (See Figs. 8, 9, 10, and 12.)

On one side of the frame-bar $8^e$, extending horizontally in an angular direction, (see Figs. 10 and 12,) is a short frame portion 27, either rigidly secured to the frame-bar $8^e$ or forming a portion of it. Secured to the under side of the frame-bar $8^e$ in the usual way by bolts is a box 28, set diagonally thereon, in which is mounted a horizontal driving-shaft 29, having its opposite end mounted in a box 30. (See Fig. 9, where the box is shown. See also Figs. 10 and 12, in which the shaft 29 is shown.) At the outer end of the shaft 29 is rigidly secured the driving-pulley 31, and alongside of the driving-pulley is the usual loose pulley 32. Pivoted to a small supporting-frame 33 is the usual shifting-bar 34 for shifting the driving-belt from one pulley to the other. (See Figs. 9, 10, and 12.)

The mechanism for raising and lowering the flask on the movable table as it rotates is represented in Figs. 8 and 9, where it is shown in position in the machine. For the construction and operation of this portion of the machine reference is had to Figs. 1, 34, 35, 36, 37, 38, and 39, all on Sheets 1 and 11.

On the top of the stationary annular table 1 is rigidly secured a raised rib $35^b$, having an inclined end $35^c$ and a vertical end $35^d$, which causes the operation of the device while being carried over it by the rotating table to which it is attached, as will more clearly appear farther on.

To the under side of the movable annular table 14 is rigidly secured by bolts a stationary depending frame consisting of the side portions 35 $35^a$, secured by bolts 36. (See Figs. 35 and 37.) At each opposite end 37 of the frame-pieces 35 and $35^a$ is mounted a roller 38, adapted to turn easily therein. A vertically-movable frame is located between the two stationary side frames 35 and $35^a$, and consists of a flat horizontal portion or table 39, having on its under side two downward-extending side portions 40, in which are mounted so as to turn easily in their bearings two rollers 41, which are parallel with the rollers 38 and located above them. On the top portion 39 is rigidly secured a series of vertical pins 42, which extend up through the annular table 14 and the plate $14^a$, upon which the pattern $14^c$ is secured, and thereby (when in their upward position) lift the flask $14^f$ above and off from the pattern, substantially as shown in Fig. 35.

Located between the two sets of rollers 38 and 41 is a horizontally-movable portion 43, having wedge-shaped portions 44 and $44^a$, which move longitudinally between the two pairs of rollers 38 and 41, (see Fig. 36,) and thereby raise or lower the plate 39 and its pins 42. Rigidly secured to and extending down from the under side of the annular table 14 are two ears 45, between which is pivoted a depending slotted arm 46. This arm 46 extends down through a longitudinal opening in the horizontally-movable wedge-bar 43 and between two downward-extending ears 47, either rigidly attached to or forming a part of the wedge-bar 43. A pin 48 passes through the ears 47 and through the slot 49 in the swinging arm 46. It will now be seen that if the arm 46 be made to swing on its pivot back and forth it will cause the wedge-bar 43 to move longitudinally back and forth, and that as it does so the wedges 44 and $44^a$ will, while moving in the direction of the arrow $44^b$, force the upper rollers 41 and the vertically-movable table 39, to which they are connected, upward, and an opposite longitudinal movement of the wedges 44 and $44^a$ will allow said table to move downward. This horizontal movement of the wedges is produced while the table 14 is rotating. As the table 14 carries the device around, the flask, the pins 42, and the vertically-movable table 39 are in their lower position until the lower end of the slotted arm 46 comes in contact with the end $35^d$ of the rib $35^b$, (see Fig. 34,) where it is shown just approaching the end $35^d$. When the arm 46 is turned in the position shown in Fig. 36, so that it moves on top of said rib, the wedge-bar 43 is in its forward position and the flask lifted upward. This operation raises the table 39 and the flask, as above mentioned, into the position shown in Figs. 35 and 36. As the table continues its movement the end of the arm 46 passes along over the rib 35$^b$, and when it comes to the incline 35$^c$ the arm 46 drops to its normal position, and the weight of the flask on the pins 42 and the weight of the table 39 and its rollers 41, resting on wedges having their lower sides resting on the rollers 38, causes said wedges to move back or in an opposite direction to the arrow 44$^b$, thereby allowing the pins 42 and the table to move downward to their normal position, as shown in Fig. 34. To prevent noise or too great a concussion, I employ an air-cushion 36$^a$, against the piston-rod of which the end $r$ of the wedge-bar 43 strikes when moving in that direction. There is one of these flask-raising devices for every flask the table is capable of supporting. I have shown six flasks on the table in Fig. 10 as a suitable number. The raised rib 35$^b$ (shown in Figs. 1, 34, 35, and 36) is located at the point where the flask is to be taken off from the table. Consequently each flask raising and lowering device is only operated once every time the annular table makes a revolution.

A horizontally-swinging frame carries the ramming-hammers, the sand receiving and depositing mechanism, and other operating parts, and consists of two upper substantially horizontal and parallel side frame-bars 47 and 47$^a$. (See Figs. 8, 9, 10, 12, 19, and 19$^a$.) These frame-bars are securely bolted at their rear ends to a cross-bar 48, having a central hub 49. (Shown in Figs. 8, 9, and 21.) The hub 49 is bored out centrally to fit the vertical shaft 6, down over which it is passed until it rests on top of a ball-bearing collar 50. (See Fig. 21.) The ball-bearing collar 50 is made in the usual way and rests on a collar 51, made in two parts and rigidly secured to the shaft 6 by screw-bolts 52. (Shown in Figs. 8, 9, and 21.) To the front of the side bars 47 47$^a$ are secured by screw-bolts 53 (see Fig. 19$^a$) the vertical side frame-pieces 54 and 54$^a$, and extending from the top of one side frame-piece to the other is a cross-bar 55, (see Figs. 8, 9, 10, 12, and 22,) rigidly secured by screw-bolts 53$^r$. (Shown in Fig. 19$^a$.)

At the bottom of the side frame-pieces 54 and 54$^a$ are securely fastened thereto by means of the braces 56 and bolts 56$^a$ two base-plates 57 and 57$^a$, and between them is secured a sand-receptacle. On the under side of the front base-plate 57 is a curved rib 59, preferably formed in one piece with it.

Supported on three of the lugs 11 is a correspondingly-curved bar 60, (see Fig. 6,) which is located immediately below the curved rib 59. This curved bar 60 is also further supported by two supporting-brackets 61. (See Figs. 1, 2, and 4.)

On the top of the curved bar 60 is mounted in supporting-frames 62 a series of rollers 63. (Shown in Figs. 6, 8, 9, 10, 12, 16, and 19$^a$.) On these rollers 63 the curved rib 59 rides and supports the front of the horizontally-swinging table.

At the rear of the horizontally-swinging table is rigidly secured a bar 64, extending diagonally rearward and provided with a pivoted friction-roller 65 at the end. (See Fig. 10, also the detached views, Figs. 19, 31, and 32.) To make the bar more rigid and secure in its position, a diagonal brace 66 is secured to the bar 64 by a bolt 64$^a$, and its opposite end is secured to the top side bar 47$^a$. This diagonal brace 66 is provided with a horizontal slot 67, (see Figs. 8 and 9,) where a section through this brace is shown. Its object will appear farther on.

On the vertical shaft 21 is rigidly secured by a key 68 a tappet 69, the end of which, as the shaft 21 turns, passes through the horizontal opening 67 in the brace 66. During a portion of each rotation of the shaft 61, which turns in the direction of the arrow $t$, the tappet 69 comes in contact with the friction-roller 65 and moves the swinging table, (in the direction of the arrow X, Fig. 10,) which turns on the main vertical shaft 6, as hereinbefore stated. At the instant the end of the tappet 69 passes by the friction-roller 65 the portion 70 on the side of the swinging frame comes in contact with the piston-rod 71 of an air-cushion 72 (see Fig. 10) and allows the frame to come easily to the limit of its horizontal swinging movement in that direction. For a detail drawing of the air-cushion 72 see Fig. 33 on Sheet 10, in which 73 represents the piston, 71 the forward piston-rod, and 74 the rear piston-rod, which passes into a reduced portion 72$^a$ against a spiral spring 75. The object of the spiral spring 75 is to insure the return movement of the piston until it touches a stop 76 if the condensed air within the cushion-cylinder should not be sufficient for that purpose. The movement back or the reverse movement of the swinging frame is as follows: The rotating table, (see Figs. 6, 7, and 12,) which moves in the direction of the arrow A, is provided with a series of brackets 77, rigidly secured in place by bolts 77$^a$. The front faces of these brackets are flat and extend vertically upward, and they correspond in number with the number of the plates upon which the patterns are secured. In this instance I have shown six, substantially as represented in Fig. 6; but the number of these plates may be varied, the other parts of the machine being made to correspond.

On the side frame-piece 54$^a$ (see Figs. 16 and 17) is a vertically-movable bar 78, fitted in slideways 78$^a$ and 78$^b$, so as to keep it in alinement. Near the top of the bar 78 is a side extending cam portion 79, (see Fig. 16,) and on the end of a shaft 80, mounted in boxes on the frame of the horizontally-swinging table, is rigidly secured a cam 81, which gives the bar 78 its required upward and downward movements. The bar 78 is provided with two ears 82, between which is pivoted a swinging bar 83, (see Figs. 16 and 17,) having an air-cushion 84 for preventing it from being forced too quickly inward. The bar 83 is also secured by a bolt 83ª, which limits its movement outward. It is also provided with a spiral spring 85 to keep its lower end outward, slightly away from the side of the machine, with a yielding force when free to act, and for the further purpose of acting as a cushion, substantially as shown in Fig. 17. The operation of this portion of the device is as follows:

The rotating table 14, it will be noticed, moves in the direction of the arrow A. (See Fig. 6.) Consequently the brackets 77 are moving the same way and in the direction required for this movement of the horizontally-swinging table. By reference to Fig. 16 it will be seen that the cam 81 has turned around sufficiently to allow the bars 78 and 83 to drop downward, and by reference to Fig. 17 it will be noticed that the lower end 86 of the swinging bar 83 is in contact with the face of one of the brackets 77, and as long as this contact is kept up the rotating table 14 and the horizontally-swinging table will move together; but the movement of the rotating cam 81 is so timed that just before the horizontally-swinging table has reached the limit of its movement in this direction (in the direction of the arrow Y) the said cam 81 has advanced far enough to lift the bar 83 out of engagement with the bracket 77, thereby leaving the horizontally-swinging table in motion by its own inertia until stopped by the air-cushion 87, which is similar in construction to the air-cushion for easing and stopping its opposite movement. The horizontally-swinging frame having completed its movement in the direction of the arrow Y, the tappet 69 again comes into action, and the reverse movement of the horizontally-swinging frame is repeated, as hereinbefore described, the cam 81 having again advanced to a position which allows the bar 83 to move downward and engage with another bracket 77.

The box for supplying sand to the flask or the reciprocating sand-box is represented in Figs. 8, 9, 10, 12, 13, 14, 15, 19, and 27. I will refer to Figs. 7, 8, 10, 13, 19, and 27. It consists of a rectangular box or frame 88, (see Fig. 13,) the rear inner side 88ᵇ being substantially vertical and the opposite inner side 88ª being on an incline of about forty-five degrees, more or less. (See Figs. 13 and 14.) This reciprocating sand-box is adapted to move across the table 57 back and forth and over the vertically-movable sand-receptacle 89. At one end of the reciprocating sand-box is pivoted an arm 90 and at the other end an arm 90ª, (see Figs. 10, 12, and 16, also Figs. 13, 14, and 19,) having their opposite ends pivoted to two arms 91 91ª, mounted on and rigidly secured to a shaft 92, (see Figs. 10, 12, and 16,) which is mounted in boxes on the frame-pieces 92ª. At or near the center of the shaft 92 is rigidly secured an upward-extending arm (see Figs. 10, 12, and 30) consisting of two parts 93 and 93ª, (see Fig. 30,) the part 93ª being swiveled to the part 93 by a flanged bolt 94, secured to the part 93 by a set-screw 94ª, the flanged portion or head 94ᶜ holding the part 93ª firmly in place to the portion 93, while allowing it to turn thereon.

A spiral spring 95 is fitted to move easily in the socket 93ⁱ, and within the spring 95 is a bolt 95ª kept from going in too far by a transverse pin 95ᵇ. The socket 93ⁱ is located centrally between the projecting portions 93ᵇ and 93ᶜ, which extend outward in the line of movement in opposite directions and the bolt 95ª extends upward above the top of the arm 93ª and extends into a hole in the arm 96. A portion of the arm 96 is represented in Figs. 28, 29, and 30, and in Figs. 8, 9, 10, and 12 the entire arm is shown. It is provided with a slot 97, through which a reduced top portion of the shaft 21 passes. (See Figs. 8 and 10.) At the end opposite the end engaged by the arm 93ª is a pivoted friction-roller 98, pivoted by a pin or bolt to its under side, which roller 98 fits and operates in a horizontal grooved cam 99, rigidly secured to the vertical shaft 21, so as to be rotated by it.

It will now be seen that the reciprocating sand-box receives its proper backward and forward movements by the action of the horizontal grooved cam 99, which, in connection with the slotted arm 96, transmits motion to the arm 93 93ª, from thence to the shaft 92, arms 91 91ª, and arms 90 90ª, connected with the reciprocating sand-box, and thereby carry the sand and drop it into the flask 14ᶠ, as will more clearly appear farther on. The pin 95ᵇ extends out through a slot 1ᵈ. (See Fig. 29.) At the base of the arm 93 is a bearing 1ᵉ, located on the hub of the arm 93, (shown in Fig. 28,) and on the shaft 92 is another bearing 1ᶠ. (See Figs. 10 and 12.) In these bearings is mounted a shaft 1ᵍ, (see Figs. 12, 28, 29, and 30,) having a hand-lever 1ʰ. (Shown in Figs. 12 and 16.) On the shaft 1ᵍ is rigidly secured an arm 1ⁱ, having a chain 1ʲ connected to its outer end, the opposite end of the chain 1ʲ being connected to the pin 95ᵇ. (See Figs. 28 and 29.)

When it becomes necessary for any reason to prevent or stop the operation of the reciprocating sand-box while the rest of the machinery is working, all that is required to be done is to move the arm 1ʰ (shown in Fig. 16) to one side sufficiently to draw the bolt 95ª down out of the hole in the horizontal arm 96. (Shown in Figs. 8, 9, 10, and 12, and a portion of it in Figs. 28, 29, and 30.) This operation will allow the arm 93 93ª to remain stationary while the horizontal arm 96 is in operation, and consequently the reciprocating sand-box remains stationary.

If the sand should be dropped directly into the flask from the reciprocating sand-box, so as to fill it with the loose sand, the flask would not be nearly or completely filled when the sand was condensed by the ramming mechanism. To avoid this difficulty, I employ an automatically vertically-movable rectangular frame that rises sufficiently to allow the flask to pass under it without obstruction and then moves downward and rests upon the top of the flask while the charge of sand is being put in, also while the ramming and condensing mechanism is in operation, and then after all this work has been done and the sand has been condensed properly, as it should be, upon the pattern and so as to project a little above the top of the flask this rectangular frame is automatically moved upward sufficiently to allow the flask, with its packed sand and pattern, to pass under without touching it. Its construction is as follows:

The rectangular frame 89 is located between the bed-plates 57 57$^a$, so as to fit closely and move or slide up or down between them. (See Fig. 18, where this frame and the base-plates or tables are shown in cross-section; see also Figs. 13, 14, and 19.) At each end of the rectangular frame 89 is an upward-extending end frame-piece 1$^k$. (See Fig. 27, where a portion of this rectangular frame is shown and one of the end frames 1$^k$.) The frame portions 1$^k$, being located at each end of the frame 89, are within the side frame-pieces 54 54$^a$ of the horizontally-swinging table. At the rear of each side frame-piece is secured by bolts a box 1$^L$, (see Figs. 8, 9, 16, and 19,) in which is mounted a shaft 1$^m$. On the shaft 1$^m$ are rigidly secured two arms 1$^n$ and 1$^r$. (See Figs. 8 and 9, also Figs. 10, 16, and 18.) The opposite ends of the arms 1$^n$ and 1$^r$ are pivoted to the top of the end frame-pieces 1$^k$, and to an extension from the rear end of the arm 1$^r$ is secured by bolts a long arm 1$^s$, having a hook-shaped portion 1$^t$ at the end. The weight of the rectangular frame 89 and its connections keep the end or the portion 1$^t$ up against a cam 1$^u$, which is rigidly mounted on a shaft 1$^v$. (See Figs. 18 and 19, also Figs. 8, 10, and 12).

From the above construction it will be seen that as the shaft 1$^v$ rotates its cam 1$^u$ will give the arm 1$^s$ an up-and-down swinging motion, and consequently the rectangular frame 89 will receive a similar up-and-down movement, but to a much less degree. In Fig. 18 the frame 89 is shown at the limit of its movement downward and in Figs. 13, 14, and 15 at the limit of its upward movement. The movements of the cam 1$^u$ are so timed that the frame 89 rises in time for the flask to pass under it and moves down so as to rest on the top of the flask as the sand-box advances to drop the sand into it. It then rises up as the swinging table is completing its movement in the direction of the table 14. The reciprocating sand-box is made of larger or smaller capacity by means of removable pieces of wood 1$^w$ (see Figs. 13 and 14) at the side, which may be made larger or smaller, and also at the ends by the removable blocks or pieces of wood 1$^x$, (see Fig. 15,) which can also be of any required size, according to the capacity of the flask or the pattern used to mold from. After the sand has been thus deposited in the flask the reciprocating sand-box in its forward or return movement draws a vertically-movable scraper or plate 1$^z$ (which is fitted in vertical slideways at each end of the reciprocating sand-box, so as to drop downward by its own gravity) over two curved wooden portions 2$^a$, located transversely at each end of the vertically-movable frame 89, which causes the plate 1$^z$ to rise and fall in accordance with the shape of the portions 2$^a$, the shape of which may be varied to suit the various conditions required for this purpose. The plate 1$^z$, in being thus drawn over, scrapes off the surplus sand, and thereby leaves the sand deeper at the front and rear sides than in the center of the flask. The construction shown answers a good purpose for one kind of pattern—a radiator-section, for instance. The portions 2$^a$, being removable and preferably made of wood, can easily be changed in shape, or one kind can be removed and new ones of a different shape inserted in lieu thereof when a pattern of a different shape calls for it. This scraping device is an important feature in a molding-machine, because it is one of the requirements that cannot be dispensed with in successful practice, that is, the sand in a mold must be packed harder in some parts of a flask than in others, especially at opposite sides of the flask; but different shapes of patterns require different treatment in this respect, and that is the reason why I make the parts 2$^a$ of wood or of some equivalent material the shape of which can be easily changed when required, or they can be removed and new ones of a different shape can be inserted in their place, as hereinbefore mentioned.

After the reciprocating sand-box has deposited a measured charge of sand in the flask and has moved forward and scraped off the sand, as above mentioned, I employ an intermediate pressing or condensing device consisting of a pressing-platen. In referring to this portion of the mechanism reference is had to Figs. 18, 19, 19$^a$, and 21, in which enlarged views of the device showing its upward and lower positions and its operating parts are shown. Below the table 57$^a$, near each end, is a box portion 2$^b$, in which is mounted a shaft 3$^f$, having two angular arms 2$^c$ and 2$^d$ rigidly secured thereto. (See Figs. 18, 19, and 19$^a$.) At the rear end of each of the arms 2$^c$ and 2$^d$ is a counterweight 2$^e$, adjustably secured by a set-screw 3$^e$. The upper portions of the arms 2$^c$ and 2$^d$ are of an angular form, inclining upward to the top 2$^f$, the object of which will be explained farther on. At the front ends of these arms is rigidly secured by bolts 6$^g$ (see Fig. 19) a platen 2$^g$.

The construction of the platen 2$^g$ will be better understood by reference to Figs. 41, 42, and 43. It is preferably constructed of an iron plate having a series of transverse ribs $2^i$, either formed in one integral piece with it or made separate and secured to it by bolts or screws in any well-known way. On the ribs is secured a heavy woven-iron plate $2^h$, made sufficiently strong and heavy for the purpose, substantially as shown in Figs. 41, 42, and 43, or a plate of heavy perforated iron may be used, substantially as shown in Fig. 44. The object of the ribs $2^i$ is to support the woven or perforated plate and leave openings between them and the platen $2^g$ for the free escape at each side of the platen of the air passing through said perforated plate. Around the perforated plate is a downward-projecting frame $2^j$. The office of this frame is not only to add strength to the device, but to leave a depression $2^k$, extending from the lower surface of the frame to the perforated or woven surface. The object of the depression is to leave a slightly-raised portion of sand above the top of the flask after the pressing-platen has done its work before the flask passes under the smoothing or leveling roller, all of which will appear in the description of the operation of the machine.

When packing sand in a molding-flask by a sudden quick pressure or blow, it has been found that the sand cannot be properly packed around the pattern so that a good casting may be produced therefrom unless some means is provided for the free escape of the air in the loose sand. The object of the perforated platen is to do this, and I have found it impossible in my experience to make a perfect sand mold with sufficient rapidity without means for thus allowing the air to escape. Consequently it is a very important element in this kind of machine.

The counterweights $2^c$ are designed to be sufficient to raise the platen $2^g$ after being released from the mechanism that moves it downward. At the top of the platen is placed a layer of heavy felt $2^L$, rubber, or other equivalent elastic material, felt preferred. The object of this is to present a comparatively soft and yielding surface for the ramming-hammers to strike upon. It acts as a protection to the platen and produces a more suitable condensing action upon the sand in the flask. The operation of this pressing-platen is produced by a roller $2^m$, pivoted between the arms 91 and $91^a$. This roller, as the sand-box is moved forward out of the way, moves forward over the upward-inclined portions of the arms $2^c$ and $2^d$, and when they reach the points $2^f$, as in Fig. 16, the platen has moved down to its lowest point and given its part of the ramming-pressure on the sand in the flask. When the arms 91 and $91^a$ move back again, the platen is raised up by the counterweights $2^e$ to the position shown in Fig. 18. At the moment the perforated platen reaches the limit of its downward movement the ramming-hammers drop and strike a heavy blow on the felt top of the platen.

In describing the construction and operation of the ramming-hammers reference is had to Figs. 8, 12, 22, and 24. Near the top of the horizontally-swinging frame is mounted in suitable bearings a shaft 80, having one end provided with a bevel gear-wheel $2^p$, rigidly secured to it and located on the outside of the frame. (See Figs. 12, 19, and $19^a$.) To the side of the frame is secured by bolts two supporting-brackets $2^q$ $2^r$, carrying bearing-boxes in which is mounted a shaft $2^s$, extending lengthwise of the frame and provided with a bevel gear-wheel $2^t$, adapted to gear in with the wheel $2^p$. At the opposite end of the shaft $2^s$ is another bevel gear-wheel $2^u$, adapted to engage with a bevel gear-wheel $2^v$, rigidly secured at the end of the shaft $1^v$, from which the shaft $2^s$ receives its motion, and which it transmits through the bevel gear-wheels $2^p$ and $2^t$ to the shaft 80. The shaft $2^s$, it will be noticed, is arranged on an incline from the horizontal, that is, it inclines from its box $2^q$ downward to its box $2^r$. (See Fig. $19^a$.)

It will be noticed that the arm $3^r$, being provided with the curved slot $3^s$, is adjustable, so that by loosening the set-screw $3^v$ it may be turned around on the shaft so as to lift the pin $3^t$ up or down, and when the proper adjustment is made the set-screw $3^v$ may be tightened. It will now be seen that the higher the pin $3^t$ is secured upward the longer the hammer-bars $3^d$ and the gear-wheels $2^w$ will be locked together, because the extension end $3^n$ of the pawl has farther to go before it strikes the pin $3^t$ to release the hammers. Consequently the hammer-bars $3^d$ drop from a greater height than they would if the arm $3^r$ was adjusted in the opposite direction or downward.

At the top of each hammer-bar $3^d$ is rigidly secured a disk $3^w$ by a nut $3^x$. The object of this disk is to form a piston which falls into the sockets $3^a$ when the hammers drop and thereby acts as an air-cushion when required. A stop-cock $3^v$ may be used to adjust the force of the air-cushion or relieve it entirely when necessary.

Sometimes it becomes necessary to stop the action of the ramming-hammers, while the other parts of the machine are in operation. For this purpose a shaft $5^a$ is mounted in boxes $5^b$ at the top of the horizontally-swinging frame, (see Figs. 45 and 46,) so as to turn easily therein. On the shaft $5^a$ are rigidly secured two upward-extending arms $5^c$ and $5^d$, (see Fig. 46,) connected by a cross-bar $5^e$.

On the outside of the swinging frame is loosely mounted an arm $5^f$. It has an easy movement on the shaft $5^a$, but limited by means of a pin $5^g$, rigidly secured to the shaft $5^a$ and extending through a slot $5^h$ in the hub $5^i$ of the arm $5^f$, (see Figs. 47 and 48,) so it can be moved either way as far as the slot $5^h$ will allow. The upper portion of the arm $5^f$ is provided with a weight $5^j$ to hold it when turned either way. At the foot of the arms $5^c$ and $5^d$ is a forward and back extension $5^k$ and $5^L$, the object of which is to limit the arms 5ᶜ and 5ᵈ in either their forward or back movements, both movements of which are shown in Fig. 45.

From the above description it will be seen that when it becomes necessary for any reason to stop the action of the ramming-hammers all that is required to be done is to turn the arm 5ᶠ so as to bring the cross-bar 5ᵉ under the disks 3ʷ at the top of hammer-bars 3ᵈ, as shown in Fig. 45, and thereby hold them in their upward position, thus preventing their operation. When it is desired to bring them into operation again, the arm 5ᶠ is turned so as to bring the cross-bar 5ᵉ to the position shown by the dotted lines 5ᵐ and the weight 5ʲ to the position shown by the dotted lines 5ⁿ, the weight moving farther than the cross-bar because of the slot 5ʰ, as will be understood.

After the flask has passed the pressing and ramming mechanism it passes under the smoothing or leveling roller for the purpose of further condensing and leveling the back of the mold. In describing this smoothing-roller reference is had to Figs. 8 and 10, where it is shown in its position on the machine, and for details of its construction reference is had to Figs. 20 and 49.

On the shaft 80 is mounted so as to turn loosely thereon a series of gear-wheels 2ʷ, (see Figs. 22, 23, and 24, also Figs. 7 and 8,) and between each gear-wheel 2ʷ is a collar 2ˣ. These collars are all rigidly secured to the shaft by a key 2ʸ or other well-known means, (see Figs. 22 and 23,) so that the wheels 2ʷ turn loosely on the shaft 80 between the collars 2ˣ. Each collar 2ˣ is provided with a tooth 2ᶻ, rigidly secured to it. On the cross-bar 55 is a series of socket-pieces 3ᵃ, corresponding in number with the gear-wheels 2ʷ. Each socket-piece is provided with a downward-extending tubular portion 3ᵇ, (see Fig. 22,) which tubular portions are fitted in holes in the cross-bar 55 and each secured by a nut 3ᶜ. (Shown in Fig. 22.) In the tubular portions 3ᵇ is a series of hammer-bars 3ᵈ, each having gear-teeth 3ᵍ on one side, adapted to gear in with the teeth in the gear-wheels 2ʷ. (See Figs. 22 and 24.) Back of each hammer-bar 3ᵈ is a guide-bracket 3ⁱ, rigidly secured to the under side of the cross-bar 55 by a screw-bolt 55ᵗ, (see Fig. 22, also Fig. 26, where the guide-bracket 3ⁱ is shown in perspective,) the object of which is to keep the hammer-bars 3ᵈ in alinement and in gear with the wheels 2ʷ and to provide a suitable slideway for them to move in. (See Figs. 22 and 24.) At the lower end of each hammer-bar is secured by a set-screw 3ʲ or other equivalent means a ramming-hammer 3ᵏ. (See Fig. 22.) On the side of each gear-wheel 2ʷ (see Fig. 22) is pivoted by a screw-pin 3ᴸ (see Figs. 22 and 24) a pawl 3ᵐ, having a rear extension 3ⁿ. 3ᵖ represents a spring which when free to act keeps the hooked end 3ᵠ down over the tooth 2ᶻ on the collars 2ˣ, thereby holding the wheels to the collars until released, as will appear farther on. On each collar 2ˣ is mounted an arm 3ʳ, having a curved portion provided with a curved slot 3ˢ. (See Figs. 22 and 24, also Fig. 25, where a detached perspective view of the arm 3ʳ is shown.) The arm 3ʳ is also provided with an inward-extending pin 3ᵗ. (See Fig. 24, where this pin is shown, and Fig. 22, where its position is shown by dotted lines.) These arms 3ʳ turn loosely on the shaft 80 and are secured to the brackets 3ⁱ by a screw 3ᵛ, which passes through the slot 3ˢ, Figs. 23 and 24. The operation of this portion of the machine is as follows: The shaft 80 and the series of wheels 2ʷ turn in the direction of the arrow on the wheel 2ʷ, (shown in Fig. 22,) and thereby lift the bars 3ᵈ upward until the rear extension-piece 3ⁿ on the pawl 3ᵐ passes under the pin 3ᵗ, when the hook end 3ᵠ of the pawl is lifted up off from the tooth 2ᶻ, thereby releasing the wheel 2ʷ, so that the bars 3ᵈ and ramming-hammers instantly drop and strike a blow on the felt top of the pressing-platen 2ᵍ, and as the hammers all drop together, or substantially so, a heavy blow is given, sufficient to properly condense the sand around the pattern in the flask.

The smoothing-roller 4ᵃ is made in the form of a frustum of a cone. It is constructed hollow and preferably of wood, so as to be as light as possible consistent with the necessary strength, and is provided with a spider 4ᵇ, preferably of cast-iron or its equivalent, at each end. The spider in the larger end is shown in Fig. 50. It is mounted on a shaft 4ᶜ, which is keyed or otherwise rigidly secured within said spiders. The outer end of said shaft is mounted in a box 4ᵈ on one side of the vertical supporting-bar 9, (see Figs. 10, 12, 20, and 49,) and the opposite end of the shaft 4ᶜ is mounted in a box 4ᵉ on the end of the arm 23ᵃ. (Shown in Figs. 8, 20, and 49.) A plan view of the arm 23ᵃ, to which the box 4ᵉ is attached, is shown in Fig. 40. This roller is suspended in its bearings so as to turn loosely therein and allow the flask to pass under it.

After the flask has passed under the smoothing-roller and been leveled it has been found that from the springing of some of the parts or for some other reason the sand still projects up above the top of the flask from a sixty-fourth or thirty-second of an inch, so that when the two parts of the mold are put together the clamping device when forcing them together will cause the sand to be forced in that much each way, thereby contracting the mold and the size of the casting made therein and sometimes injuring the mold. This becomes a serious objection when molding articles that are required to be made in large numbers and all of as nearly the same weight as possible, or with hollow articles in which a core is used and they are required to be cast as thin as possible and of an even thickness throughout. To meet this objection, I employ a scraper 4ᶠ for scraping off the surplus sand from the back of the flask as it passes from under the roller $4^a$, reference being had to Figs. 49, 50, 51, and 52 for the details of the construction and operation of the scraper. It consists of a thin sheet-metal scraping portion $4^f$, rigidly secured at its ends between and to the two curved arms $4^g$ and $4^h$ by screws or bolts or in any well-known way. The opposite ends of the arms $4^g$ and $4^h$ are enlarged and mounted on the shaft $4^e$, so as to swing easily thereon and thereby raise or lower the scraper $4^f$.

At the back of the scraper $4^f$ is a substantially-vertical supporting-rod $4^i$, the lower end of which hooks into a hole in the back of the scraper and the upper end extends up through a bracket $4^j$ on one of the top radiating arms 8, (see Figs. 10 and 12, also 49 and 50,) and is secured by a screw portion and nuts $4^k$ and $4^L$, by which the supporting-rod $4^i$ is made adjustable, so as to raise or lower the scraper and then rigidly secure it.

Above the scraper are two arms $4^m$ and $4^n$, rigidly secured to the arms $4^g$ and $4^h$, and mounted in bearings in said arms is a shaft $4^p$, carrying a conveyer $4^q$ for taking off the loose sand that may gather on the top of the scraper. This conveyer is run by a belt $4^r$. (See Fig. 52.) The belt $4^r$ may be connected with a pulley located at any suitable point on the machine, or it can be connected with a pulley running on the main line of shafting near the ceiling in the building in which the machine is located. The belt runs in the direction of the arrow $i$, Fig. 52, so as to carry the sand forward over the side of the machine. On the conveyer-shaft $4^p$ are mounted two arms $4^s$ and $4^t$, the outer ends of which carry in suitable bearings a roller $4^u$, mounted so that its center will be a little forward of the edge of the scraper. The object of this roller $4^u$ is to hold the sand on the scraper as it gathers thereon, so that it may be more readily taken by the conveyer and carried off from the flask and machine.

The shaft 80, which carries the gear-wheels $2^w$ for operating the hammers, also the cam 81 for operating the vertically-movable bar 83 for engaging with a bracket 77 on the table 14 when moving the horizontally-swinging table, receives its rotary movements from the driving-shaft 29 by means of the bevel gear-wheel $2^t$ on the shaft $2^s$. The shaft $2^s$ receives its movements by means of the bevel gear-wheels $2^u$ and $2^v$, and the shaft $1^v$, which carries the bevel gear-wheel $2^v$, receives its movement by means of the bevel gear-wheels $7^a$ and $7^b$, (see Figs. 19 and $19^a$, also Figs. 8 and 9,) and the gear-wheel $7^b$ receives its movements by means of a horizontal spur-wheel $7^c$, which is rigidly secured to it, and both turn on the vertical shaft 6 and an intermediate gear-wheel $7^d$, which is mounted on a vertical stud on an arm $7^e$, rigidly secured to the vertical shaft 6, and engages with the gear-wheel $7^b$ and a horizontal spur gear-wheel $7^f$, rigidly secured to the vertical shaft 21, (see Figs. 9 and 11,) from which all the above movements are obtained. The horizontal bevel-wheel $7^b$ and spur-wheel $7^c$, being adapted to turn on the vertical shaft 6, rest and are supported on the hub of the arm $7^e$. (See Fig. $19^a$.)

The operation of the machine is as follows: Motion being transmitted by means of a driving-pulley 31 to the driving-shaft 29 and its bevel gear-wheel and from thence to a horizontal bevel gear-wheel 26 imparts to the vertical shaft 21 and its spur-pinion 20 (see Figs. 8 and 9) a rotary motion in the direction of the arrow $e$, (shown in Fig. 6,) and the pinion 20, being in gear with the horizontal spur gear-wheel 16, which is rigidly secured to the table 14, gives said table a rotary movement in the direction of the arrow A. (Shown in Figs. 6, 10, and 12.) The table 14 being now in continuous motion, as above described, and being provided with a series of patterns $14^e$, (or other pattern,) one pattern being firmly secured to each table $14^a$, the operator places a flask $14^f$ on the tables $14^a$ at the point S as fast as they come opposite said point. (See Figs. 10 and 12.) Said flask is carried along with the moving table 14 (which is in continuous motion, as above set forth) and passes under the horizontally-swinging frame or table, which is now in the position shown in Fig. 10. When said flask (the one put in place at the point S) is immediately under the swinging table, or nearly so, (the vertically-movable frame 89 having moved up to allow it to pass, as heretofore mentioned,) the vertical bracket 77, which was at or about the point T when said flask was put in position, will now be nearly to the side of the horizontally-swinging table, but before it reaches that point the cam 81 (see Figs. 16 and 17) has been turned around with its shaft 80, so as to allow the lower end of the bar 83 to drop down directly in the pathway of the said bracket, which engages as it moves forward with the lower end of the said bar 83 at the point 86, as shown in Fig. 17, thereby carrying the swinging table with it, and during the time the two—the table 14 and the horizontally-swinging table—are thus in engagement and both move together the sand-receptacle 88 $88^b$ moves and deposits its sand into the flask and then moves back out of the way. The pressing-platen then moves down and presses the sand into the flask around the pattern. The mechanism for operating the hammers releases them, so that they drop and strike the required condensing blow upon the platen, all as hereinbefore described. The instant all of the above-named operations have been performed the cam 81 lifts the bar 83 and releases the swinging table from the bracket 77 and table 14, and its horizontally-swinging movement in that direction is stopped by the air-cushion 87. The tappet 69 is now in position and reverses the action of the swinging table, as hereinbefore described, and the same operation is being repeated with another flask, while the said flask (which has been continuously moving with the table 14) passes under the smoothing-roller and the scraper and is then removed at or about the point R. (See Figs. 10 and 12.)

The above operations are continuous. While one flask is being put onto the table the one preceding it is operated upon under the horizontally-swinging table, and when it leaves said swinging table another flask takes its place.

I claim as my invention—

1. In a molding-machine, the combination of a continuously-rotatable table mounted on rollers on a supporting-base and having a series of brackets located on its horizontal face near the periphery at equal distances apart or substantially so, each bracket having a vertical portion facing the direction of movement, with a horizontally-swinging frame mounted on suitable supports on the machine so as to swing thereon and carrying the sand feeding and ramming mechanism, a vertically-movable bar mounted in guideways on one side of said frame, a cam secured to a shaft mounted in boxes on said swinging frame for engaging with and allowing the vertically-movable bar to move downward and engage with one of said brackets so that the movement of the swinging frame coincides with that of the horizontal rotating table, and then lifting said bar when the horizontally-swinging table has reached the limit of its movement in the direction of that of the rotating annular table, means for rotating said table and means for operating said cam, substantially as described.

2. In a molding-machine, the combination of a continuously-rotating table carrying a series of patterns, and mounted on a suitable support on the machine, and means for rotating said table, with a horizontally-swinging table and frame mounted on the central vertical shaft so as to swing thereon, and carrying the sand feeding and ramming mechanism, a frame-bar carrying a friction-roller at the rear of the swinging table and frame, means for moving said table and frame in one direction, a tappet secured to a vertical rotatable shaft mounted in bearings on the frame of the machine, and means connecting it with the driving-shaft for rotating said vertical shaft and tappet and thereby reversing the movement of the swinging table, substantially as described.

3. In a molding-machine, the combination with a rotatable table and means for turning it, of a horizontally-movable frame having its rear portion mounted on a central vertical supporting-shaft so as to swing horizontally thereon, a curved supporting-bar secured to the stationary table or base, a series of rollers mounted on said curved bar for supporting the front base portion of said horizontally-swinging table above the annular rotatable table, and means substantially as above described for giving the swinging table a horizontal swinging movement back and forth as above set forth.

4. The combination in a molding-machine, of an annular table mounted centrally on a vertical supporting-shaft and resting on a supporting-base so as to turn thereon, means for giving said table a rotary motion, a horizontally-swinging frame or table having its rear end mounted on said vertical central shaft and its front end supported on rollers mounted on a suitable supporting-base, means for giving it a swinging movement coinciding with the rotating table, a sand-feeding receptacle mounted on said swinging table, and means for operating it or moving it back and forth while the swinging table is in motion, substantially as described.

5. In a molding-machine, the combination of an intermediate pressing-platen mounted on arms pivoted to the machine, means substantially as above described for giving it its up-and-down movements for partly condensing the sand on a pattern in a flask, a covering of felt secured to the top of said platen, a series of ramming-hammers adapted to drop thereon to complete the condensing of the sand in said flask and means for operating said ramming-hammers, substantially as described.

6. In a molding-machine, the combination with a stationary circular table provided with rollers and a vertical central supporting-shaft, of a rotatable table mounted on said rollers and adapted to turn on the vertical shaft, means for giving said table a continuous rotary motion in one direction, a horizontally-swinging frame having its rear end mounted on the vertical shaft so as to swing thereon and having its front base supported on rollers mounted on a stationary support on the machine, means engaging with the driving mechanism and rotating table for swinging said frame horizontally back and forth, a sand-box mounted on said swinging frame, for feeding sand into a flask located on the continuously-moving table, a pressing-platen mounted on arms secured to a shaft set in bearings on the swinging table, ramming-hammers, mounted on the horizontally-swinging table above the pressing-platen, for condensing the sand into the flask, and means substantially as above described for giving the sand-feeding mechanism, the pressing-platen and ramming-hammers their operating movements while the horizontally-swinging table is moving in unison with the continuously-rotating table.

7. In a molding-machine, the combination with the swinging frame, of the ramming-hammers and vertical hammer-bars mounted in said frame, and the disks or collars mounted on top of said bars, with a shaft mounted in bearings at the top of the horizontally-swinging frame and carrying two arms provided with foot-pieces to limit their rocking movement and connected at their tops by a cross-bar, and means consisting of a weighted arm mounted loosely on its shaft and provided with a slot $5^h$ and a pin rigidly secured to the shaft for limiting its movement, for moving said arms and cross-bar into or out of engagement with the disks at the top of the hammer-bars, so that the weight will hold them in either position for the purposes described.

8. In a molding-machine, the combination with a horizontally-swinging table, means for operating it and a table adapted to rotate continuously in one direction while the machine is in operation, means for rotating said table a series of rollers set in bearings upon a supporting-base and a vertical shaft on which the table turns, of a sand-feeding receptacle, arms connecting said receptacle with arms secured to a shaft mounted in boxes at the top of the horizontally-swinging frame and provided with an arm operated by a horizontal arm, a vertical driving-shaft on which said horizontal arm vibrates, and a friction-roller carried by the horizontal arm in engagement with a grooved cam mounted on the vertical driving-shaft for operating the sand-receptacle, substantially as described.

9. In a molding-machine, the combination with a swinging frame of a vertical rack-bar mounted in vertical bearings on the swinging frame and carrying a ramming-hammer, a gear-wheel $2^w$, in gear with said rack-bar, and mounted loosely on a shaft set in bearings on the horizontally-swinging frame, collars rigidly secured to said shaft between which the gear-wheel rotates, a tooth secured to one of the collars, a spring-actuated pawl carried by the gear-wheel and adapted to engage with said tooth, to hold the wheel in engagement with the collar so as to rotate with it and the shaft, and means substantially as above described for disengaging said pawl from the tooth on the collar and thereby allowing the hammer to drop, as above set forth.

10. In a molding-machine, the combination with a swinging frame of a vertical rack-bar mounted on the horizontally-swinging frame and carrying a ramming-hammer, a gear-wheel in engagement with said rack-bar mounted loosely on a shaft adapted to rotate continuously in one direction and set in boxes on said horizontally-swinging frame, means for rotating said shaft, collars between which the gear-wheel rotates, rigidly secured to said shaft, a tooth on one of said collars, a spring-actuated pawl carried by the gear-wheel and adapted to engage with the tooth on the collar to hold the gear-wheel and collar in engagement and provided with a rear extension, an arm provided with a curved slot mounted on the collar and having an inward-extending pin $3^t$, for disengaging said pawl, and a set-screw for securing said curved slotted arm and its pin $3^t$, at any point of its adjustment, whereby the device may be adjusted to drop the hammer-bar at any desired point, substantially as described.

11. In a molding-machine, the combination with the sand-feeding receptacle and means for operating it, of an automatically-operated plate set in vertical slideways located within the sand-feeding receptacle so as to operate by gravity, a sand-holding frame, and an irregular-shaped bar secured at each end of the sand-holding frame below said plate, on which the lower edge of said plate is moved back and forth as the sand-receptacle is moved, and thereby automatically operated for scraping off the top of the sand in the frame above the flask for the purposes described.

12. In a molding-machine, the combination of a supporting-table provided with a series of rollers set in bearings thereon, a central supporting-shaft mounted in the center of said supporting-table, a rotatable table mounted on said vertical shaft and resting on said rollers so as to turn thereon in one direction only, means for rotating said table, a series of flask-raising devices secured to the under side of the rotatable table and consisting of a frame rigidly secured to the under side of the rotatable table and carrying a roller at each end, a flat plate having flask-raising pins which extend up through the table and platform $14^a$, and downward-extending sides between which are mounted rollers located so as to be directly above the rollers in the stationary frame, a horizontal bar having a wedge portion at each end, 44 $44^a$, and located between the upper and lower sets of rollers, a depending slotted arm pivoted to the under side of the moving table and having its lower end connected by a pin passing through the slot and secured to a portion extending from the wedge-bar, and a raised rib on the stationary table whereby the device is operated by said rib as the moving table carries it over, substantially as described.

ORRIN BRYANT.

Witnesses:
JAMES SANGSTER,
HARRIET JOHNSON.